Aug. 6, 1946.  H. H. EBY  2,405,412
CONTACT-MAKING WIRE CLAMP OR CONNECTOR
Filed June 10, 1943
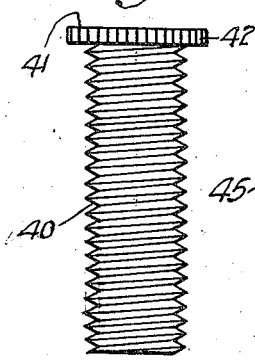
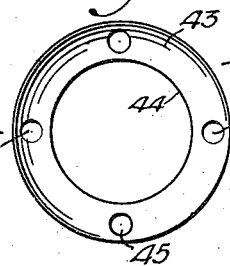
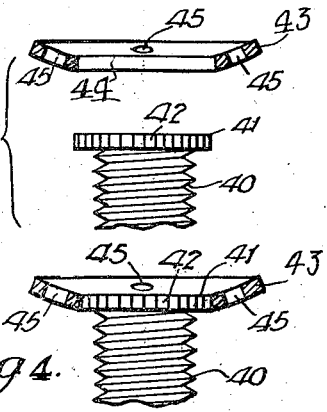
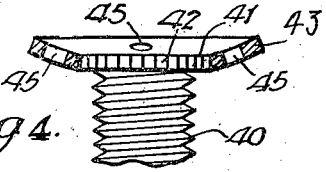
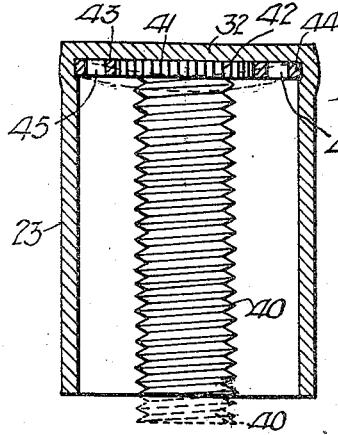
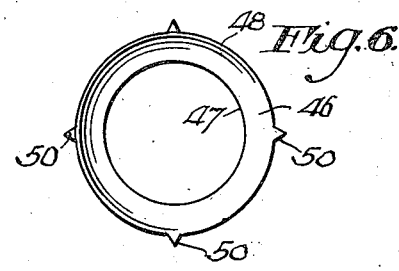
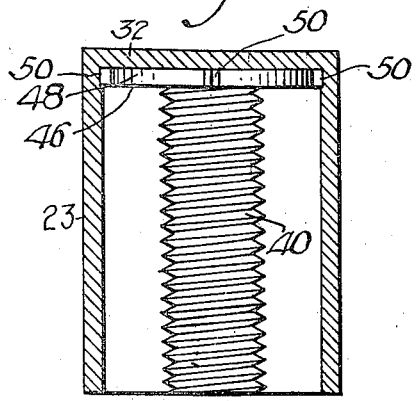
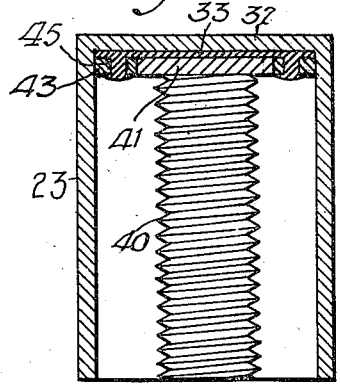
INVENTOR.
Hugh H. Eby.
BY Barr, Borden & Fox
ATTORNEYS Patented Aug. 6, 1946

2,405,412

UNITED STATES PATENT OFFICE 2,405,412

CONTACT-MAKING WIRE CLAMP OR CONNECTOR

Hugh H. Eby, Philadelphia, Pa., assignor to Hugh H. Eby, Inc., a corporation of Pennsylvania Application June 10, 1943, Serial No. 490,372

4 Claims. (Cl. 85—1)

This invention relates to contact-making wire clamps or connectors, and particularly to such devices as are generally designated as binding posts.

In my earlier Patent No. 2,267,449, an improved and highly efficient binding post was disclosed that has had wide commercial success. While the effectiveness of this binding post was not affected thereby, the previous constructions according to the patent provided an externally knurled sleeve which had internal threads to engage the externally threaded end of the relatively fixed portion of the clamp, but which also had a relatively thick axial stud integral with the sleeve and spaced from the internal threads thereof. The expense of cutting solid stock to form the sleeve and integral stud and the difficulty in internally threading the sleeve while the stud remained in the axial center of the sleeve can be appreciated. As this could not be very well accomplished on an automatic screw machine, this forms an item of cost in the production of the devices that is higher than is required or justified by the end result of the machining steps. It will be clear that the reversal of this structure so as to provide a threaded central stud integral with an overhanging and surrounding sleeve or skirt would require the threading of the stud in the confining presence of the sleeve and for all reasons just mentioned would be equally undesirable. On the other hand, the alternative, disclosed in my said patent, of an externally threaded stud having an integral flange or thumb piece at one end, but without any surrounding sleeve, was possessed of at least three undesirable features. Thus, the thumb piece, even though knurled, was too short axially for an efficient grip by the fingers of the operator, so that frequently the wire was not clamped as rigidly as was necessary, it was practically impossible to anchor the stud in its threaded bore against undesired retraction and loss or separation from the relatively fixed end of the assembly, and the main body of the clamp was not enclosed by a surrounding housing sleeve, so that both appearance and protection for the assembly was sacrificed.

It is among the objects of this invention; to improve upon the structures disclosed in my said earlier patent; to provide an improved contact-making wire clamp of improved economy of construction; to provide a cheap and rugged contact-making wire clamp; to provide a movable portion of a binding post of the Eby type formed by automatic screw machine operations; to simplify the construction of wire clamp components with an enhancement of the strength thereof; to secure all of the benefits of the skirted cap with the axial shank rigidly concentric therewith without the disadvantage of threading of either the cap or the stud or plug with the complemental plug or cap integral therewith; to improve the method of forming a contact-making wire clamp; to provide a movable portion of a binding post of parts made by automatic screw machines assembled by induction heating; and to provide as a movable part of a binding post assembly a flanged threaded shank soldered into a knurled cap as an axially concentric part thereof.

In the accompanying drawing:

Fig. 1 represents a side elevation of a threaded stud with a flanged head of reduced diameter as a separate unit for subsequent anchored association with a larger washer to form a larger flange.

Fig. 2 represents a plan of a disc-like washer to be associated with the unit stud of Fig. 1.

Fig. 3 represents a fragmentary exploded section partially in elevation of the individual units of Figs. 1 and 2 in juxtaposition prior to axial assembly.

Fig. 4 represents a fragmentary section, partially in elevation of the parts of Fig. 3 in assembled unitary relation, as found prior to association with a shell or cap element.

Fig. 5 represents a longitudinal section through an assembly of the flanged threaded stud in a receiving shell showing in dotted lines the initial position, and in full lines the ultimate interlocked anchored position.

Fig. 6 represents a plan of a modified form of a disc-like washer to be associated with a unitary stud of Fig. 1.

Fig. 7 represents a longitudinal section partially in elevation through an assembly of the disc of Fig. 6 as a part of the flanged stud in the anchored position thereof in a cap element or shell, and Fig. 8 represents a longitudinal section partially in elevation of a modified form of assembly of threaded stud and shell utilizing solder.

Referring to Fig. 1, a threaded shank 40 is provided with an integral flange 41 of appreciably reduced diameter compared to thimble 23 and the flange is preferably provided with axially extending peripherally disposed serrations or grooves and the ribs 42 such as to bite engagingly into the axial aperture of a cooperating washer to be described. The flange 41 of the stud may be annular as shown, or polygonal in contour. In one form of washer as illustrated in Fig. 2, a disc washer 43 is provided having an axial opening 44 to have a frictional fit with the flange 41 of the stud. The disc has an outer peripheral edge arranged to slide into the cap or shell 23, and in a preferred embodiment is dished so as to be more or less concave in section, so that the outer edge is axially spaced away from the end of the flange 41 when the latter has been forced into the axial aperture 44 of the disc 43. The axial aperture 44 may be annular as shown, or polygonal in outline, so as to accord with the particular predetermined shape of the flange 41 of the stud.

With the disc thus rigidly anchored on the end of the threaded shank the unitary assembly is dropped into the open end of the thimble, cap or shell 23, until the outer peripheral edge 44 engages the end wall 32, after which the stud is given an axial impact or thrust which drives the flange portion 41 of the stud toward the wall 32, while simultaneously flattening the disc and expanding the latter against the inner wall of the cap adjacent to the wall 32, which forces it to dig into the wall to such a degree that the parts are rigidly locked together. This avoids the use of solder and the heating associated therewith, and effects a very cheap assembly, especially as the disc can be made by a stamping and the flanged stud can be made as a result of an upset head method. This latter procedure both saves metal and also increased the production rate.

It is contemplated that the disc 43 may be provided with solder receiving apertures 45, and may start in a planar form, so that when assembled with the threaded shank 40, the whole can be dropped into a cap or shell 23 upon a disc of solder 33 or the like, for induction heating and the anchoring of the flange to the cap, with solder in the holes 45 as shown in Fig. 8, for instance.

It will be clear that any desired form of disc may be used to facilitate the anchoring attachment of the cap and threaded shank. Thus, and purely illustratively, the disc 46 of Fig. 6 is provided which is preferably dished or concave and has an axial opening 47 to receive the serrated edge of the flange 41 of the stud. The outer periphery 48 is generally of smaller diameter than the inner wall of the cap or shell 23, except for pointed protuberances 50, which engage and anchor in the wall of the cap 23 after insertion and spreading incident to axial pressure on the end of the stud 40.

It will be obvious that if desired, a small flange, either continuous or discontinuous (not shown), may be formed, extending laterally beyond and at the lower portion of flange 41 so as to abut the lower face of dished washer 43, to more certainly force the latter into planar form. While in Fig. 5 the forcing of the washer into planar form has resulted in a slight bulging of the outer periphery of the shell 23, according to the showing of this figure, it will be obvious that if this is undesirable, it can be obviated and all distortion precluded by disposing the shell 23 in a confining anvil and support while the stud assembly is forced into position. This reinforcing action of the support forces the edges of the flange into more intimate biting engagement with the continued purely cylindrical shell wall 23.

Of course, if desired for any purpose, either of the forms illustratively disclosed herein may be associated with a soldering step after the spreading from the axial pressure, or the solder may comprise a smaller disc and the composite flange may remain concave while the solder engages therewith to anchor the assembly together.

The simplicity, cheapness and sturdiness of the assembly will be clear.

Having thus described my invention, I claim:

1. In contact-making wire clamps a movable portion for association with a relatively fixed internally threaded portion, comprising a thimble having a transverse web at one end and being open at the other, a threaded shank having a flange of such diameter as to be slidable axially into the thimble to overlie the web, and means anchoring the flange and web together to rigidly dispose the shank concentrically in the center of the thimble, comprising peripheral recesses in the flange defining anchoring points to interengage with said thimble, said flange being initially dished to form a convex face so that the diametrical distance between said points is not greater than the diameter of the thimble and said shank extends in its entirety from the convex face of said flange, and said flange being arranged to respond to relative axial pressure on the shank forcing the flange into substantial parallelism with the web to diametrically space said points to a degree such that the diametrical distance between points exceeds the diameter of the thimble to anchor said points in the thimble.

2. In contact-making wire clamps a movable portion for association with a relatively fixed internally threaded portion, comprising a thimble having an integral transverse web at one end and being open at the other, a threaded shank having a flange of such diameter as to be slidable axially into the thimble to overlie the web, and means anchoring the flange and web together to rigidly dispose the shank concentrically in the center of the thimble, said threaded shank and flange comprising a shank having a small flange engaging in an apertured dished larger flange and comprising together a unit for insertion in said thimble arranged to be substantially flattened against the web in response to axial pressure on the threaded shank in which after flattening no part of the small flange extends beyond the plane of the larger flange in the anchored relation of the parts incident to such flattening.

3. In contact-making wire clamps a movable portion for association with a relatively fixed internally threaded portion, comprising a thimble having an integral transverse web at one end and being open at the other, a threaded shank having a flange of such diameter as to be slidable axially into the thimble to overlie the web, said flanged end of the threaded shank being initially dished into a convex face from which the entire shank extends and susceptible to straightening under axial pressure upon the threaded shank against the web to engage laterally into the wall of the thimble as a means for anchoring the shank and thimble together.

4. In contact-making wire clamps a movable portion for association with a relatively fixed internally threaded portion, comprising a thimble having an open end and an integral transverse web at the other, a threaded shank having a flange of such diameter as to be slidable axially into the thimble through the open end, and means anchoring the flange and thimble together to rigidly dispose the shank concentrically in the center of the thimble, said flange being initially dished into a convex face from which the entire shank extends and having an edge arranged for frictional engagement with the thimble wall when the flange is flattened to anchor the thimble and threaded shank together, and said threaded shank and flange arranged to flatten the flange against the web under axial pressure on the shank.

HUGH H. EBY.

Certificate of Correction

Patent No. 2,405,412. August 6, 1946.

HUGH H. EBY

It is hereby certified that the above numbered patent was erroneously issued to "Hugh H. Eby, Inc., a corporation of Pennsylvania" as assignee of the entire interest therein whereas said patent should have been issued to the inventor, "Hugh H. Eby" and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*